(12) United States Patent
Soczka-Guth et al.

(10) Patent No.: US 6,348,516 B1
(45) Date of Patent: Feb. 19, 2002

(54) METHOD FOR PRODUCING SOLUTION OF POLYMERS FUNCTIONALIZED BY ACID GROUPS BY MICROWAVE RADIATION

(75) Inventors: Thomas Soczka-Guth, Hofheim; Helmut Witteler, Beindersheim; Gregor Deckers, Frankfurt; Georg Frank, Tübingen; Kilian Brehl; Jürgen Lenze, both of Frankfurt; Harald Bönsel, Waldems; Rüdiger Knauf, Aull, all of (DE)

(73) Assignee: Celanese Ventures GmbH (DE)

( * ) Notice: Subject to any disclaimer, the term of this patent is extended or adjusted under 35 U.S.C. 154(b) by 0 days.

(21) Appl. No.: 09/424,982

(22) PCT Filed: Jun. 2, 1998

(86) PCT No.: PCT/EP98/03263

§ 371 Date: Jul. 6, 2000

§ 102(e) Date: Jul. 6, 2000

(87) PCT Pub. No.: WO98/55534

PCT Pub. Date: Dec. 10, 1998

(30) Foreign Application Priority Data

Jun. 6, 1997 (DE) .......................... 197 23 854

(51) Int. Cl.$^7$ .............. C08J 3/28; C08K 5/00; C08K 5/05; C08K 5/02; C08G 75/14; C08G 75/20; C08G 61/10

(52) U.S. Cl. .............. 522/74; 522/85; 522/86; 522/84; 522/75; 522/78; 522/79; 522/156; 522/162; 522/163; 524/242; 524/243; 524/250; 524/255; 524/714; 524/717; 524/742; 524/746; 524/765; 524/766; 524/800; 524/805; 524/817; 524/841; 524/845; 524/846

(58) Field of Search .............. 522/74, 75, 78, 522/79, 84, 85, 86, 156, 162, 163; 524/242, 250, 255, 243, 714, 717, 742, 746, 765, 766, 800, 805, 817, 841, 845, 846

(56) References Cited

U.S. PATENT DOCUMENTS

| | | | | |
|---|---|---|---|---|
| 3,929,741 A | * | 12/1975 | Laskey | |
| 4,339,303 A | * | 7/1982 | Frisch et al. | |
| 4,462,929 A | * | 7/1984 | Shacklette et al. | |
| 4,777,336 A | * | 10/1988 | Asmussen | |
| 5,272,216 A | * | 12/1993 | Clark, Jr. et al. | |
| 5,321,222 A | * | 6/1994 | Bible et al. | |
| 5,471,037 A | | 11/1995 | Goethel et al. | |
| 6,175,037 B1 | * | 1/2001 | Tweedy | |

FOREIGN PATENT DOCUMENTS

| | | |
|---|---|---|
| DE | 43 27 805 | 2/1994 |
| EP | 0 465 858 | 1/1992 |
| JP | 02/263837 | 10/1990 |
| JP | 03/196834 | 8/1991 |
| JP | 05/310907 | 11/1993 |

* cited by examiner

*Primary Examiner*—Susan W. Berman
(74) *Attorney, Agent, or Firm*—Connolly Bove Lodge & Hutz LLP

(57) ABSTRACT

Process for using microwave irradiation to prepare solutions of polymers functionalized with acid groups The invention relates to a process for preparing aqueous, hydrous and anhydrous solutions of polymers functionalized with acid groups, which comprises using microwave radiation to supply the heat required to prepare the solution. The solutions are suitable as a starting material for producing gas diffusion electrodes, fuel cells and polymer-electrolyte-stabilized platinum nanoparticles.

19 Claims, No Drawings

METHOD FOR PRODUCING SOLUTION OF POLYMERS FUNCTIONALIZED BY ACID GROUPS BY MICROWAVE RADIATION

BACKGROUND OF THE INVENTION

1. Field of the Invention

Process for using microwave irradiation to prepare solutions of polymers functionalized with acid groups.

2. Description of the Prior Art

The present invention relates to a process for using microwave radiation to prepare solutions of polymers functionalized with acid groups, to a process for preparing the solid, soluble or insoluble polymers, and also to the use of the solutions.

Many high-performance polymers, such as polyether ketones, partially fluorinated or perfluorinated polymers and polyphenylene sulfides, are highly insoluble. While this insolubility is precisely what is required for many applications, it does, however, make the processing of these polymers very considerably more difficult, or in extreme cases impossible.

The derivatives of these polymers functionalized with acid groups, such as —SO$_3$H, —B(OH)$_2$, —CO$_2$H and —PO$_3$H are, in contrast and depending on their degree of functionalization, soluble in solvents such as dimethylformamide, dimethyl sulfoxide, dimethylacetamide or N-methylpyrrolidone. With particularly high degrees of functionalization these polymers may also become water-soluble.

There is great demand for aqueous solutions of polymers of this type, functionalized with acid groups. Examples of the advantages of dispensing with organic solvents are cost reduction, environmental protection factors and factors relating to workforce health. It is also desirable, and particularly in the field of preparation of noble-metal catalyst materials, to avoid, or at least minimize, the use of solvents containing hetero-atoms, in particular containing chlorine, sulfur or nitrogen, since these can act as catalyst poisons. This is the reason for, for example, interest in aqueous preparations of proton-conducting polymers for producing gas diffusion electrodes for fuel cells or electrolysis units.

U.S. Pat. No. 5,453,161 discloses the preparation of polyimides derived from benzophenone-3,3',4,4'-tetracarboxylic acid, where the reaction mixture is heated by microwave radiation. The product is not reported to be water-soluble.

JP-05 310 907 discloses a process for removing methylene chloride from polymers by using microwave radiation. There is no report that the solubility of the polymers is higher after the microwave irradiation than is the case with traditional processes for introducing heat.

Against the background of the prior art, the object was to develop a process by which polymers carrying acid groups can be prepared in a form which gives rise to greater solubility in water and in organic solvents.

SUMMARY OF THE INVENTION

Surprisingly, it has been found that polymers carrying acid groups are more soluble in water and in organic solvents when exposed to microwave radiation than when exposed to heat and pressure.

The invention provides a process for preparing aqueous, hydrous and anhydrous solutions of polymers functionalized with acid groups, which comprises using microwave radiation to supply the heat required to prepare the solution.

DESCRIPTION OF THE PREFERRED EMBODIMENTS

Even polymers whose low degree of functionalization gives them no, or only very slight, solubility, even on heating under pressure (temperature up to 175° C., pressure up to 4 bar) can be dissolved by this process. The acid groups with which the polymers have been functionalized are preferably sulfonic acid, phosphoric acid, carboxyl and/or boric acid groups.

Possible solvents are especially water, dimethylacetamide, N-methylpyrrolidone, dimethyl-formamide, dimethyl sulfoxide, alcohols such as isopropanol, and also mixtures of two or more of these substances.

The polymers preferably used are polyether ketones, polyphenylene sulfides, partially fluorinated or perfluorinated aliphatic polymers or polyether sulfones, in particular those with an ion-exchange capacity (IEC) of from 0.5 to 2 mmol of acid function per g of polymer. Particular preference is given to the use of polymers of the formula 1

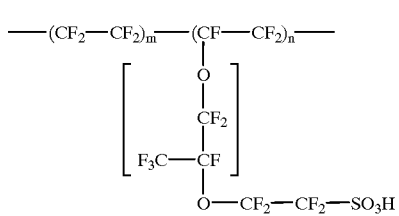

which are marketed by DuPont with the tradename ®Nafion. The coefficients are: Z≧1, m=from 5 to 14, and n=100.

Unlike when heated without microwave irradiation, it has been found that especially sulfonated polyether ketones (PEKs), polyether ether ketones (PEEKs) and polyether ether ketone ketones (PEEKKs) can be dissolved with a significantly lower degree of sulfonation with microwave irradiation. No detectable molecular weight degradation takes place when the novel process is carried out. The solution result achieved here, under relatively mild conditions (low temperature and pressure), is at least comparable and in fact mostly significantly better than when heating without microwave irradiation. It is clear that the microwave radiation itself, and not the heat released by the microwave radiation, is responsible here for the good solubility performance of the polymers under these conditions.

In addition, polymers whose low degree of functionalization gives them no, or only slight, solubility in a non-aqueous solvent without microwave irradiation when heating, even under pressure, can be dissolved using microwave irradiation in N-methylpyrrolidone, dimethylacetamide, dimethyl-formamide, org. sulfoxide, such as sulfolan, or in dimethyl sulfoxide. This makes it possible for the first time for polymers with a low degree of functionalization, i.e. with a small proportion of derivatized repeat units, to be processed from solution. For example, it is possible to process sulfonated polyether ketones with a degree of sulfonation of ≦35% from NMP solution.

The invention also provides a process for obtaining the solid polymers from the microwave-irradiated solutions. After the novel process has been carried out, these polymers are insoluble in the solvent from which they were obtained.

The solutions of the polymers in water may be concentrated by evaporation to dryness. The solid polymer regained in this way may be dissolved in water by heating without microwave irradiation, or annealed to become water-insoluble, and from this condition may once again be converted into a water-soluble condition by microwave irradiation. The advantage of this surprising property is that the polymers can be transported in a soluble form without solvents, then can be dissolved without microwave irradiation and, after processing and after removing the solvent by evaporation, can be annealed to become insoluble.

No degradation of molecular weight takes place here during the microwave irradiation, as can be shown with the aid of gel permeation chromatography (GPC) or thermal field flow fractionation (TFFF). Dissolved and undissolved fractions also show no differences in molecular weights and the degree of sulfonation which they show is uniform. In the course of dissolving, therefore, no extraction of more highly sulfonated or low-molecular-weight compounds takes place.

The solutions prepared by the novel process are suitable, for example, for producing gas diffusion electrodes, fuel cells and polymer-electrolyte-stabilized platinum nanoparticles.

EXAMPLES

In all of these solutions experiments with microwave radiation the microwave apparatus used was the CET model MDS 2000. For safety reasons, the apparatus is operated at only 50% of the nominal rating, with a pressure limit of 3.99 bar and with a temperature limit of 1750° C. The sample vessels used were Teflon autoclaves with screw fittings. Before the microwave radiation is switched on, the sample vessels are flushed with nitrogen.

Example 1

Sulfonated PEEK, dissolved in water using microwave irradiation.

47.5 g of water and 2.5 g of ground, sulfonated PEEK with a degree of sulfonation of 51% are placed in a microwave autoclave and flushed with nitrogen for 4 minutes. The microwave apparatus is then switched on for 5 minutes. After the gauge pressure has fallen to 0.1 bar, the autoclave is opened and the resultant solution is centrifuged at 4500 rpm for 30 min. The resultant clear solution is concentrated by evaporation. Determining the dry weight of the solution shows that 98.3% of the polymer has dissolved. The molar mass of the polymer is determined by GPC (system: Waters, temperature 650° C., polystyrene calibration, solvent: NMP, with the addition of 0.05% of lithium chloride). The number-average molar mass and the weight-average molar mass here are, respectively, 65,000+/-3000 g/mol and 160,000+/-8000 g/mol, for the starting polymer, for the solution of the polymer and also for the undissolved polymer.

Example 2

Sulfonated PEEKK, dissolved in water using microwave irradiation.

47.5 g of water and 2.5 g of ground, sulfonated PEEK with a degree of sulfonation of 65% are placed in a microwave autoclave. The autoclave is closed and flushed with nitrogen for 5 minutes. The microwave apparatus is switched on for 10 minutes. After cooling, the solution is centrifuged at 4500 rpm for 30 min. The water-soluble fraction of the polymer is 1.989 g (79%). The undissolved residue is 0.461 g (19%). The molar mass of the polymer is determined by GPC (system: Waters, temperature 650° C., polystyrene calibration, solvent: NMP, with the addition of 0.05% of lithium chloride). The number-average molar mass and the weight-average molar mass here are, respectively, 55,000 +/-3000 g/mol and 130,000 +/-8000 g/mol, for the starting polymer, for the solution of the polymer and also for the undissolved polymer.

Comparative Example 3

Sulfonated PEEKK is dissolved in water without microwave irradiation.

1 g of sulfonated, ground PEEKK with a degree of sulfonation of 65% is charged to a glass autoclave together with 19 g of distilled water. An oil bath is used to heat this for 40 min to a temperature of 165° C. (internal pressure 3.5 bar), followed by cooling. This gives a brownish gel. The supernatant liquid is slightly cloudy and comprises only about 0.05 g of polymer, corresponding to 5%.

Example 4

Sulfonated PEEK, dissolved in N-methylpyrrolidone using microwave irradiation.

3 g of sulfonated, ground PEEK with a degree of sulfonation of 33% are charged to a microwave autoclave together with 57 g of N-methylpyrrolidone. The microwave autoclave is flushed with nitrogen for 5 min. The microwave apparatus is then switched on for 5 minutes. After cooling, this gives a clear, pale yellow solution with a brownish sediment. The soluble fraction is 84% (2.53 g).

What is claimed is:

1. A process for preparing an aqueous, hydrous or anhydrous solution of a polymer functionalized with one or more acid groups, which comprises heating the polymer in a solvent by exposing it to microwave radiation to form the polymer solution.

2. The process as claimed in claim 1, wherein the one or more acid groups are sulfonic acid, phosphoric acid, carboxyl and/or boric acid groups.

3. The process as claimed in claim 1, wherein the solvent is water, dimethylacetamide, N-methylpyrrolidone, dimethylformamide, an organic sulfoxide, an alcohol, or a mixture thereof.

4. The process as claimed in claim 3, wherein the alcohol is isopropanol.

5. The process as claimed in claim 3, wherein the organic sulfixide is sulfolan or dimethyl sulfoxide.

6. The process as claimed in claim 1, wherein the polymer is a polyether ketone, a polyphenylene sulfide, a polyether sulfone or a compound of the formula 1:

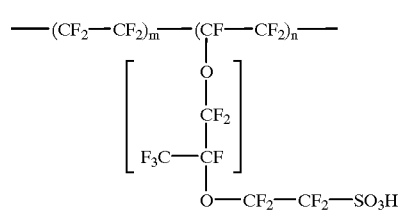

where $Z \geq 1$, m=from 5 to 14 and n=100.

7. The process as claimed in claim 6, wherein the polyether ketone is a sulfonated polyether ketone, a polyether ether ketone or a polyether ether ketone ketone.

8. The process as claimed in claim 1, wherein the polymer has an ion-exchange capacity of from 0.5 to 2 mmol of acid functionality per g of the polymer.

9. A process for preparing a polymeric solid from the polymer solution of the process as claimed in claim 1, comprising evaporating off the solvent from the polymer solution to form the polymeric solid, wherein the polymeric solid is soluble in the solvent from which it was obtained.

10. The process as claimed in claim 9, further comprising annealing the polymeric solid such that it is insoluble in the solvent which was used with the microwave irradiation to prepare the polymer solution.

11. The process as claimed in claim 1, wherein the polymer is a partially fluorinated or perfluorinated aliphatic polymer.

12. The process as claimed in claim 1, wherein the polymer is a sulfonated polyether ether ketone and the solvent is water.

13. The process as claimed in claim 1, wherein the polymer is a sulfonated polyether ether ketone ketone and the solvent is water.

14. The process as claimed in claim 1, wherein the polymer is a sulfonated polyether ether ketone and the solvent is N-methyl pyrrolidone.

15. The process as claimed in claim 1, wherein the polymer is a sulfonated polyether ketone having a degree of sulfonation of $\leqq 35\%$ and the solvent is N-methyl pyrrolidone.

16. A polymeric solid prepared by the process as claimed in claim 9.

17. A polymeric solid prepared by the process as claimed in claim 10.

18. A process for preparing a gas diffusion electrode, a fuel cell or a polymer-electrolyte stabilized, platinum nanoparticle, comprising converting the polymer solution of the process as claimed in claim 1 into the electrode, the fuel cell or the nanoparticle.

19. A gas diffusion electrode, a fuel cell or a polymer-electrolyte stabilized, platinum nonoparticle prepared by the process as claimed in claim 18.

* * * * *